(12) United States Patent
Scheffer (10) Patent No.: US 7,474,999 B2
(45) Date of Patent: Jan. 6, 2009

(54) METHOD FOR ACCOUNTING FOR PROCESS VARIATION IN THE DESIGN OF INTEGRATED CIRCUITS

(75) Inventor: Louis K. Scheffer, Campbell, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 790 days.

(21) Appl. No.: 10/327,738

(22) Filed: Dec. 23, 2002

(65) Prior Publication Data

US 2004/0122642 A1    Jun. 24, 2004

(51) Int. Cl.
 G06F 17/50    (2006.01)
 G06F 9/45    (2006.01)
 G01R 27/28    (2006.01)
 G01R 31/28    (2006.01)

(52) U.S. Cl. .................. 703/14; 702/117; 714/732; 716/10

(58) Field of Classification Search .................. 703/14; 702/117; 714/732; 716/10
See application file for complete search history.

(56) References Cited

U.S. PATENT DOCUMENTS

| 2002/0072872 A1 * | 6/2002 | Chatterjee et al. ........... 702/117 |
| 2002/0133772 A1 * | 9/2002 | Voorakaranam et al. ..... 714/732 |
| 2003/0229875 A1 * | 12/2003 | Smith et al. .................... 716/10 |

OTHER PUBLICATIONS

Feldmann et al. 'Statistical Integrated Circuit Design'. Mar. 1993, vol. 28; pp. 193-202.*
Vikas Mehrotra. 'Modeling the Effects of Systematic Process Variation of Circuit Performance'. May 2001.*
Dai, Wayne et al., "Timing Analysis Taking into Account Interconnect Process Variation", IEEE International Workshop on Statistical Methodology, 2001, pp. 51-53.
Nassif, Sani R., "Within-Chip Variability Analysis", International Electron Devices Meeting Technical Dlgest, 1998, pp. 283-286.
Stine, Brian E. et al., "Analysis and Decomposition of Spatial Variation in Integrated Circuit Processes and Devices", IEEE Transactions on Semiconductor Manufacturing, vol. 10, No. 1, pp. 24-41, 1997.
Yeh, Ta-Hsun et al., "Mis-match Characterization of 1.8V and 3.3V Devices in 0.18um Mixed Signal CMOS Technology", Proc. IEEE 2001 Int. Conference on Microelectronic Test Structures, vol. 14, Mar. 2001, pp. 77-82.
Mehrotra, Vikas, "Modeling the Effects of Systematic Process Variation on Circuit Performance", PhD Thesis, Massachusetts Institute of Technology, May 2001.
HyperExtract Parasitic Extractor User Guide, Product Version 3.4E. QSR1, Aug. 2002.
Scheffer, L. "Explicit Computation of Performance as a Function of Process Variation" *ACM/IEEE International Workshop on Timing Issues in the Specification and Synthesis of Digital Systems*, Monterey, CA (Dec. 2-3, 2002) pp. 1-8.
International Search Report for PCT/US2003/040758 dated Feb. 14, 2005.
Liu, Ying et al., "Model Order-Reduction of RC(L) Interconnect including Variational Analysis", ACM IEEE Design Automation Conference (1999), pp. 201-206.

* cited by examiner

*Primary Examiner*—Kamini Shah
*Assistant Examiner*—Shambhavi Patel
(74) *Attorney, Agent, or Firm*—Vista IP Law Group LLP (57) ABSTRACT

A method to simulate an electronic circuit includes determining process parameters and a process variation for each process parameter, and determining a value for each of a plurality of components of the circuit as a function of the process variations.

31 Claims, 3 Drawing Sheets

METHOD FOR ACCOUNTING FOR PROCESS VARIATION IN THE DESIGN OF INTEGRATED CIRCUITS

BACKGROUND OF THE INVENTION

During the process of making semiconductor chips, each manufactured semiconductor chip is a little bit different because of process variations. Designers need to create as many chips as possible that work in spite of these process variations. Process variations are a function of many variables, and the width, thickness, and inter-layer thickness can vary independently for each layer on a chip, as can temperature and voltage. Currently designers cope with these variations by designing circuits using traditional methods such as picking a few subsets of variations, called process corners, and analyzing performance at these corners. However, these approaches are both too conservative (the specified conditions will seldom occur) and not conservative enough (they miss errors that can occur due to process variation).

For example, building a chip is a sequence of hundreds of operations, each of which will occur a little differently on each chip despite enormous effort to make them repeatable. This variation occurs in many ways. First, there is variation from chip to chip, for example, often the logic on one chip is significantly faster than on another chip. In general, but not completely, these changes are correlated, i.e., if one gate is fast, then so are all the others on the same chip.

Variations in interconnect follow a different pattern. One machine, in one action, lays down all the metal (or dielectric) for a layer of a chip. A different machine, or the same machine at a different time, lays down the next layer. Thus the layers are not correlated to each other, but they are correlated across the chip. If metal-1 is thick, then metal-1 will be thick across the whole chip, but this implies nothing about the thickness of metal-2.

There is also variation across the surface of a chip. Some of this variation is deterministic. For example, the metal or inter-layer dielectric (ILD) thickness may depend on the local metal density. Two nominally identical lines, one in the center of the chip and one near the edge, may be built differently since the optics in the photolithography step has different responses in each area.

Finally, all of the above variations have a statistical component as well, due to manufacturing variations. This statistical component may vary depending on the distance between two objects on a chip. Two components close to each other on a chip are likely to be closely matched, whereas two components further away will have larger differences.

Process variation occurs in a space of roughly $N_D=2+3+2+3N$ dimensions, where N is the number of routing layers. The first two dimensions are the (X,Y) coordinates within the chip. Each of the remaining process variables may assume a value that depends on this location. The next 3 variables are for the cell performance, perhaps diffusion width, poly width, and oxide thickness. The next two variables are for voltage and temperature. For the purpose of this discussion they can be treated as process variables. The remaining 3N dimensions occur because for each routing layer there are three main variables, metal thickness, metal width, and inter-layer dielectric thickness. Note that the metal width and metal spacing do not vary independently. Their sum, the pitch, is extremely well controlled.

Since working in 30 or so dimensions is difficult, designers have made various approximations. First, the variation of process with (X,Y) coordinate has been largely ignored, as has deterministic variation (though this is changing). Next, the number of process variation combinations is reduced to a small number of "process corners". A process corner sets all relevant variables to an extreme (usually 3σ) value. This corresponds to a corner of a hypercube in the real process space. There are $2^{N_D}$ process corners—far too many to analyze (much less the interior points). Since timing is the most important result, designers usually characterize the interconnect and cells as 'fast' or 'slow'. Cell speed and interconnect speed are largely independent since the variables that affect cell delay have very little effect on interconnect delay, and vice-versa.

This approach assumes that the most extreme delay cases will be the worst. One worst case will be with slow cells and slow interconnect; this will be used for checking for setup time problems. Fast cells and fast interconnect will be used for checking for hold problems. The two interconnect cases are obtained by using two extractions—one at fast interconnect corner, one at the slow interconnect corner. These corners are obtained by setting all relevant interconnect values to a maximum likely deviation (usually ±3σ). The two cell models are evaluated at the worst and beat combination of PVT (process, voltage, and temperature). The fast case is normally a fast process, high voltage, and cold temperature (for CMOS), and the slow case is slow process, low voltage, and high temperature. However, this approach does not address intra-chip variation at all, as it assumes all nets and cells scale exactly the same way.

Intra-chip variations, which are smaller than inter-chip variation, but are still present in a chip, are difficult to consider using traditional approaches. Analog designers have looked at this in detail, but in digital designs simpler methods are used. The major worry is that problems may arise if the clock and data signals do not track precisely. One technique, called 4 corner analysis, examines setup and hold times in fast and slow process conditions. In each of these four cases, the launching clock skew, the logic delay, and the receiving clock skew are set to their most pessimistic values.

Another technique for addressing this problem is called 6 corner analysis. It depends on classifying every gate and net as clock or data. The six corner cases that are then analyzed are when clock and data are both maximally slow; clock is maximally slow and data is almost as slow; and data is maximally slow and clock is almost as slow. The 3 corresponding cases with fast instead of slow are also considered. A complete timing analysis is done in each case. This approach assumes that clock network delays will track much more closely than data delays in general. This in turn requires that the clock network be built with this goal in mind. This is not a serious restriction if the clock network is built from the ground up, but is hard to enforce in an era of discrete electronic blocks, each with their own clocking structure.

One big problem with worst case analysis is that it is too conservative. It is extremely unlikely to have a 3σ variation on each of 30 dimensions. Without further analysis, however, we cannot tighten this bound, however, since it is possible that at least some critical paths axe determined by only one process dimension (say metal-1 resistance). Then a 3σ variation could in fact occur with significant probability.

The other problem is that corner analysis is not conservative enough, or in other words it can miss real errors. Take, for example, a flip flop where the data line is dominated by metal-1 delay and the clock line by metal-2 delay. Then the worst case for setup is when metal-1 is slow and metal-2 is fast. The worst case for hold time is when metal-1 is fast and metal-2 is slow. Neither of these two cases is found by either a (best, worst), a 4 corner, or a 6 corner analysis.

These different sources of variation into are taken into account by accounting for deterministic local variation. For example, one such effect is the proximity effect, where neighboring conductors affect the line width and spacing. OPC (Optical Proximity Correction) tries to correct this, but will not succeed completely. Likewise, there is a deterministic component to thickness that is controlled by the local density. Metal fill will try to fix this, but will also not succeed completely. These effects can be modeled straightforwardly, at least in flat extraction. For example, a possible approach includes computing the nominal width of each conductor from the neighboring width/spaces (the residual expected after OPC should be used for this correction); computing the nominal thickness of each conductor and ILD from the local density map for that layer; and deriving the R and C values from the local width and thickness.

However, if a block is extracted in isolation, the average local metal density is not known for features near the sides or corners. Furthermore, even after compensation for deterministic effects, there will still be wafer to wafer differences due to exposure differences, initial metal deposition thickness variation, non-flat wafers, and so on. Traditional approaches also require multiple runs of extraction and timing analysis to catch both the errors due to signals that are too fast and the errors due to signals that are too slow. Yet another problem is that since existing methods consider only one process point, either a net is critical or it is not. There is no way to know how much the improvement of a non-critical net is worth using existing methods.

SUMMARY OF THE INVENTION

A method to simulate an electronic circuit includes determining process parameters and a process variation for each process parameter, and determining a value for each of a plurality of components of the circuit as a function of the process variations.

DETAILED DESCRIPTION

A unified theory of process variation that includes inter-chip variation, intra-chip deterministic variation (such as caused by proximity effects and metal density), and intra-chip statistical variation is used to analyze and predict the performance of a circuit based on the circuit's design. Using this approach, the performance of the design can be explicitly computed as a function of process variation. This approach therefore computes less pessimistic timing numbers than traditional methods. This approach also allows yield optimization to occur in the design process.

In one embodiment, analyzing performance of a design as a function of process variation includes executing a computer program on a general purpose computer processor to perform a simulation of the performance of the chip design. The simulation program may perform calculations such as hierarchical extraction and deferred evaluation. Each component of the extracted circuit can be represented with a nominal value and a functional description of how the nominal value would change should one or more of the process variables change from their nominal value. A derivative is one form of such a functional description, for example. These nominal values and their functional variations can be used to consider the effects of process variation on the design once an environment is determined. The functional dependencies can be kept to compute inter-chip variations, and can also be used to enable hierarchical correction for deterministic effects. Therefore, keeping the component values as a function of the process variables allows the design analysis to consider wafer to wafer differences due to exposure differences, initial metal deposition thickness variation, non-flat wafers, and other variation effects. Starting with components expressed as a function of process variables, delays and timing can be computed as functions of process variables. From these results, detailed performance analysis and optimization may be performed.

For example, when performing timing analysis, a data signal of a flip-flip is analyzed to determine whether the signal arrives too late, which is a setup violation, or too early, which is a hold time violation. Each process condition, or quantity of interest, is described by a nominal value and additional data that describes how the quantity varies with respect to process variation (for example, the additional data may be a vector of derivatives). The timing analysis can then be performed for multiple process conditions and variations using the known variation (again, perhaps a vector of derivatives) to show whether the data signal of a flip-flop arrives neither too late nor too early over all process conditions.

The arrival time of a data signal can be represented as a continuous function of the process variations P, with components $p_1$ through $p_N$:

$$A(P)=A(p_1, p_2, \ldots, p_N)$$

One way to represent this dependency is to approximate it with a Taylor series expansion around the nominal process conditions:

$$A(p_1, p_2, \ldots, p_N) \approx A(p_1^{nom}, p_2^{nom}, \ldots, p_N^{nom}) + \Sigma a_i \Delta p_{i,a}$$

where $\Delta p_{i,a}$ is the deviation of $p_i$ from the nominal process point for the net 'A'. Since $A(p_1^{nom}, p_2^{nom}, \ldots, p_N^{nom})$ is the normal arrival time under nominal process conditions, this can be written as $A_{nom}$ and:

$$A(p_1, p_2, \ldots, p_N) \approx A_{nom} + \Sigma a_i \Delta p_{i,a}$$

The deviation from nominal of the process parameters for net A is composed of three parts—a deterministic portion, a global portion, $G_i$, and a statistical portion $S_{i,a}$, so that:

$$p_{i,a} = G_i + S_{i,a}$$

In this case, $G_i$ is the global deviation of the $i^{th}$ process parameter (i.e., metal is thick on this chip), and $S_{i,a}$ is the statistical deviation of parameter i for net A.

The clock arrival time has a similar approximation:

$$C(p_1, p_2, \ldots, p_N) \approx C_{nom} + \Sigma c_i \Delta p_{i,c}$$

The coefficients $c_i$ and $a_i$ may (in general) have different values depending on various factors such as the layer of the routes, relative amounts of wire delay and cell delay in the path.

The relative delay between the arrival times of the data and clock signals can be expressed by subtracting the clock time from the data time to get the difference:

$$A(P)-C(P)=A_{nom}-C_{nom}+\Sigma(a_i-c_i)\Delta G_i+\Sigma(a_r S_{i,a} \theta c_r S_{i,c})$$

where the $\theta$ indicates the difference is statistical. For a given net pair, the second sum evaluates to a single random variable with a known distribution. The spatial correlation of the random component may then be considered. For example, two adjacent lines on the same layer will yield a very narrow distribution, but two lines that are far apart will have a larger difference. For the setup check portion of the timing analysis, this difference is expected to be in the tolerated range of deviation, not too long (violates performance specifications) nor too small (violates hold specifications). This translates into the following conditions:

$$A(P)-C(P)<T_{max}$$

and $$A(P)-C(P)>T_{hold}$$

Each of these conditions, for each flip-flop, defines a fuzzy hyperplane in process space. (The hyperplanes are generated from the expression of the change in value of the components with respect to the change in process variables, which is the first derivative in this example. If a more general form of expression is used, curved hypersurfaces instead of hyperplanes may be generated, but the argument remains unchanged.) On one side of the hyperplane the chip will probably work, and on the other side it will probably not. The fuzziness is determined by the random component of process variation. Because this component may be small compared to the global effects, the hyperplane (in general) may not be very fuzzy. This is another way of saying that the variation within an chip is in general small compared to the variation between chips.

Since the worst conditions may be different for each flip-flop on the chip, there are at least twice as many hyperplanes as flip-flops (one setup and one hold constraint from each). Taken together, all the hyperplanes from all the flip-flops define an $N_D$ dimensional convex polytope.

The chip is expected to work provided the process condition is inside this polytope, so the polytope determines the parametric yield. This is the integral over process space of the probability of this process condition occurring times the probability that the chip works under this process condition. The point on the surface of the polytope that is closest to the origin will define the most likely condition under which the chip will fail.

Figure 1:
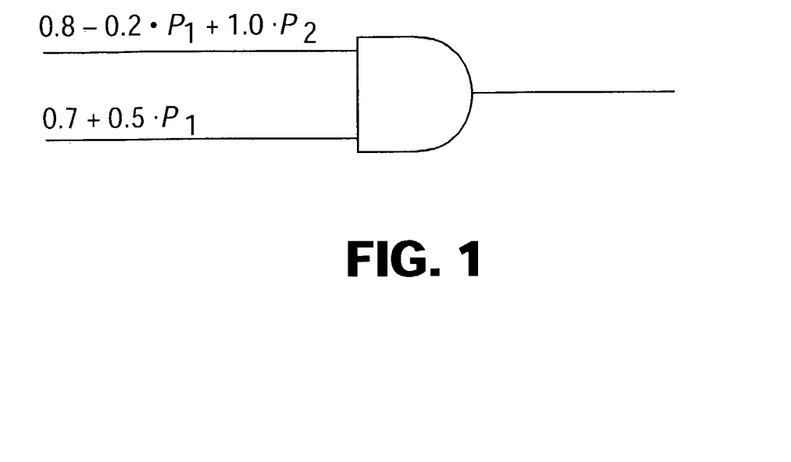
FIG. 1 shows an example of selection of process computations used when accounting for process variations of a design of a circuit.

Propagating delays with process variation through multi-input gates may include methods of selective computation to determine results quickly. For example, consider a two input AND gate. The output delay is determined by the later arriving of the two inputs as shown in FIG. 1. It is possible that the last arriving input depends on the process variation, where $P_1$ and $P_2$ have ranges $[-1,1]$. (Here, a first order approximation of the real process variation is used, and hence each response surface is a hyperplane.)

Attempting to handle this exactly may result in a combinatorial explosion. Unless the two inputs have identical process derivatives (very unlikely) there will be some conditions under which each input arrives last, so the number of hyperplanes needed to describe the output timing at least doubles with every multi-input gate. To prevent a data explosion, the timing verifier may prune, or remove, hyperplanes from consideration as it propagates delays.

Several methods for dropping hyperplanes may be used to reduce the amount of data. For each input, there is a corresponding inequality that must be satisfied when this input is the last to arrive. If this inequality cannot be satisfied (no solution within the maximum expected process variation) then the corresponding hyperplane can be removed from the calculations. Also, hyperplanes that are possible but of sufficiently low probability can be identified and removed from consideration.

Beyond this, there is a wide variety of pruning and approximation strategies that could be used. In general, the more aggressive the pruning, the less the data growth. However, aggressive pruning increases the pessimism of the results. As an example of an aggressive pruning strategy, output timing may be expressed as a single hyperplane that dominates the hyperplane derived from each input. (This is the moral equivalent of the MAX( ) function in normal timing analysis.) This may be pessimistic for most process conditions, but preserves at least some process variability and prevents data explosion. In the example above, both input hyperplanes may be replaced by $1.6-0.2*P_1+0.2*P_2$ to address a concern about maximum delays.

An analogous problem happens when propagating required times backward through the network, except the computational explosion is caused by nets with multiple fanouts instead of gates with multiple fan-ins. Similar methods may be used to discard the conditions that cannot happen and to devise a pruning strategy to cope with the rest of the conditions.

To determine how the signal arrival times vary with process conditions, several approaches may be used. One approach is to vary one $p_i$ at a time, then re-run coefficient generation, extraction, delay calculation, and timing analysis. This takes about $2N_D$ times the effort of a single extraction through timing run. This works well for extraction and delay calculation, where the results are continuous and differentiable functions of the parameters.

For timing analysis where the answers contain min and max functions, other approaches may be used. For example, a method of keeping the derivatives through each step of the simulated process may be used. Coefficient generation can keep the variation of coefficients with process variables. Then extraction can compute the variation of the Rs and Cs with process. Next, delay calculation can compute the interconnect and gate delays as a function of process. The timing verifier can sum these delays to get the final arrival times. Each step may be more complex, but obtaining full performance information over all process variations can be accomplished by running a simulation program once as opposed to of multiple times.

Figure 2:
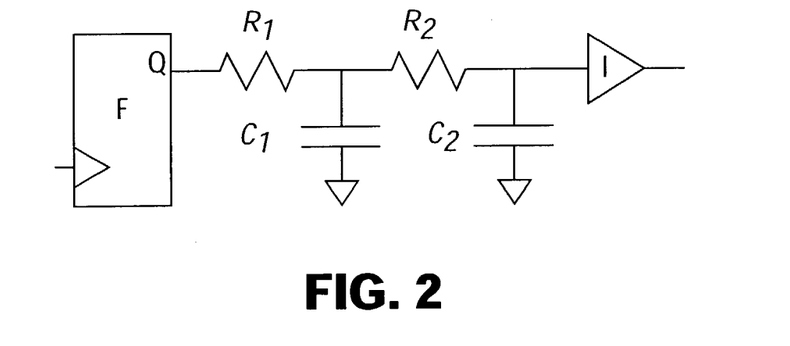
FIG. 2 shows an example of a design of a circuit that is analyzed to account for process variations.

An example of this process expresses the functional representation as a vector of derivatives. (If the variation is expressed in another functional form, the procedures of this example may be used if they are modified to include the functional form of the expression.) Adding or subtracting two variables with derivatives can be performed on a component by component basis. More complex operations can be performed with the chain rule, such as the derivative of a function whose inputs are also changing. For example, the delay of a gate as shown in FIG. 2 depends on the process conditions P, and also on the input slope I and output load C, which are also functions of P. This is expressed by:

$$\text{Delay}(\vec{P}) = D(\vec{P}, I(\vec{P}), C(\vec{P}))$$

where D gives the delay for a particular P, I, and C. From this, the derivatives are computed:

$$\frac{\partial \text{Delay}}{\partial P_i} = \frac{\partial D}{\partial P_i} + \frac{\partial D}{\partial I}\frac{\partial I}{\partial P_i} + \frac{\partial D}{\partial C}\frac{\partial C}{\partial P_i}$$

The values of the components shown in FIG. 2 are functions of process variations P. For example, the value of resistor $R_1$ is determined from $R_1(P)$, which is a function of P. The delay at pin D of the flip-flop is calculated as a function of process variation. A characterization of the delay of the flip-flop F as a function of P is determined to provide F(P). The effective load, $C_{eff}$, of the network as a function of P is also determined. If $C_{in}$ is the input capacitance of instance I, and DP the driver parameters of F (both as a function of P), then:

$$C_D = C_{Eff}(DP, R_1, C_1, R_2, C_2, C_{in})$$

Using the chain rule, the dependence of $C_{eff}$ on P is:

$$\frac{\partial C_D}{\partial P_i} = \frac{\partial C_{eff}}{\partial DP}\frac{\partial DP}{\partial P_i} + \frac{\partial C_{eff}}{\partial R_1}\frac{\partial R_1}{\partial P_i} + \frac{\partial C_{eff}}{\partial C_1}\frac{\partial C_1}{\partial P_i} + \frac{\partial C_{eff}}{\partial R_2}\frac{\partial R_2}{\partial P_i} + \frac{\partial C_{eff}}{\partial C_2}\frac{\partial C_2}{\partial P_i} + \frac{\partial C_{eff}}{\partial C_{in}}\frac{\partial C_{in}}{\partial P_i}$$

The delay D at the output of flip-flop F, as a function of process variation, is determined by again applying the chain rule:

$$\frac{\partial D}{\partial P_i} = \frac{\partial D_{ff}}{\partial P_i} + \frac{\partial D}{\partial C_{eff}} \cdot \frac{\partial C_{eff}}{\partial P_i}$$

The slope S as a function of P is computed also using the chain rule. The arrival time and slope at the input of I as a function of P is computed. The delay through the interconnect network, and the output slope, are functions of S, $R_1$, $C_1$, $R_2$, $C_2$, and $C_{in}$, all of which are functions of P. Applying the chain rule, the variation of input slope and delay with P is determined.

The slope and delay at the output of gate I is determined. The effective C on the output of I is determined. With the input slope, output load, and the delay table (or formula) for I, expressed as functions of P, the output arrival time and slope as a function of P is computed. This process may continue until the timing sinks are reached.

Figure 3:
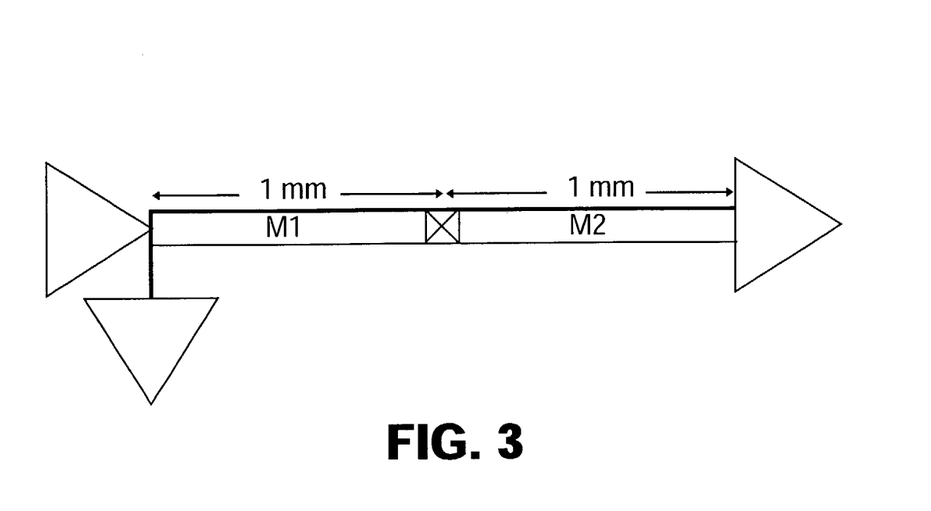
FIG. 3 shows another example of a design of a circuit that is analyzed to account for manufacturing process variations in the performance of an integrated circuit.

The example shown in FIG. 3 illustrates another example of a model of a circuit that can be expressed as a function to account for changes in performance induced by process variation. It contains a net with one driver and two receivers. The drive has a 1 Kohm output impedance ($R_s$=1 KΩ) and the line is 2 mm long, the first half of the line is metal-1, and the second half is metal-2. There are two inputs on the net, one at the driver and one at the far end. Each input has an input $C_L$ of 40 ff. To calculate the delay of this line under variation of 2 parameters, the delta width of layers 1 and 2 is determined using a model such as an Elmore delay model with values for a 130 nm copper process for example. Let $R_1$, $C_1$, and $R_2$, $C_2$ be the resistance and capacitance of the first and second portion of the line. Assuming the nominal line has a width w=150 nm, a square cross section, and the conductivity of copper, then a wire on metal-1 has resistance $$R = 746\frac{w}{w + \Delta w1}\frac{\Omega}{\text{mm}} \quad (1)$$

A nominal capacitance value of 180 ff/mm total, half to the layers above and below, and half to the neighbors on the same layer, is used. The half that couples to the neighbors scales inversely as the space to the neighbor increases, and is nominally assumed to be 150 nm away, with the same Δw. A wire segment on metal-1 will then have capacitance $$C = \left(90 + 90\frac{w}{w - \Delta w1}\right)\frac{\text{ff}}{\text{nm}} \quad (2)$$

with similar expressions for R and C of wires on metal-2. A gaussian distribution of the deltas, with a standard deviation of 10% of the width, or 15 nm, is used to approximate the variations.

Table 1 shows how the R, C, and delay (RC) of a 1 mm line vary as the line widths vary. The R and C values vary over a much wider range than their product, since they vary in opposite directions. If metal-1 is narrow, for example, R increases while C decreases. The slowest interconnect happens when Δw is negative. In this case the R goes up more than the C comes down, so this generates the longest wire delays. Conversely the fastest interconnect occurs when Δw is positive. The C is higher, but R is lower by more than enough to compensate. In all cases the interconnect delay changes by a much smaller percentage than the change in width. The correlation between these components is considered to improve the model.

TABLE 1

| | R, C and Timing with process variation | | |
| --- | --- | --- | --- |
| ΔW (nm) | R (ohms) | C (ff) | RC (ps) |
| 0 | 746 | 180 | 134.3 |
| −45 | 1065 (+43%) | 159 (−12%) | 169.3 (+26%) |
| 45 | 574 (−23%) | 219 (+22%) | 125.7 (−6.4%) |

First, look at the worst case delay at the driven end of the net. A traditional two corner analysis is too conservative. The Elmore delay at the output of the driver is $$d = R_s(2C_f + C_1 + C_2) \quad (3)$$

where $C_1$ and $C_2$ are functions of the process parameters. The slowest and fastest corners can be found by maximizing/minimizing $C_1$ and $C_2$, since $R_s$ does not vary in this example. If both $C_1$ and $C_2$ are set to their 3σ values, then the minimum delay is 399 ps and the maximum delay is 517 ps. Unless Δw1 and Δw2 are completely correlated, however, these values are conservative. If metal-1 and metal-2 have identical uncorrelated gaussian distributions, for example, the distribution will be $\sqrt{2}$ narrower than the estimate above. This corresponds to a smaller delay range of [416,500] ps, a 29% narrower spread, and shows the need to consider the degree of correlation between metal-1 and metal-2 widths to improve the results over the 2 corner approach.

Looking at the delay at the end of the line shows that the worst case is missed. This problem cannot be fixed by conventional methods of adding more process corners since the front and the end of the line each have different worst corners. The Elmore delay at the end of the line is $$d = R_s(2C_l + C_1 + C_2) + R_1\left(\frac{C_1}{2} - C_2 + C_l\right) + R_2\left(\frac{C_2}{2} + C_l\right) \quad (4)$$

Setting $\Delta w1 = \Delta w2 = +45$ nm, the usual fast corner, results in 813 ps. When $\Delta w1 = \Delta w2 = -45$ nm, the usual slow corner, the result is 822 ps. According to these calculations, the delay must be in the range [813,822] ps for all process conditions. However, because the calculations did not consider the effects of process variation, this range does not include either the fastest or slowest case. The nominal delay ($\Delta w1=0$ and $\Delta w2=0$) is 768 ps, which is outside of the range.

To correct this, the calculations (1) through (4) may be modified to include variation effects. For example, the total delay has two components, the delay of the driver and the delay through the wire. The cell delay increases with increasing C, as observed at the near input. But the wire delay decreases with increasing C, since the larger C means less R, and by more than enough to compensate. The sum of these two delays has a local minimum, which is bracketed by the two "worst case" corners. Furthermore the combination $\Delta w1 = -45$ nm and $\Delta w2 = 45$ nm has a much greater delay, about 903 ps. This happens because wire R is the dominant contributor to the delay near the driver, but wire C dominates the delay near the end.

To account for the variations in the values of R and C, the extractor generates the nominal values and an expression of the way they change with respect to changes in process parameters (a derivative, for example, can express this change to first order). For this example, the analytic expressions (1) and (2) can be used to generate the nominal values and their corresponding expression of change. Then, an expression for how the delays change with respect to changes in process parameters is calculated. For example, for the near end load, equation (3) is used to find:

$$\frac{\partial d}{\partial w1} = \frac{\partial d}{\partial C_1}\frac{\partial C_1}{\partial w1} = R_s\frac{\partial C_1}{\partial w1} = +0.600 \text{ ps/nm}$$

and likewise for the delay as a function of $\Delta w2$:

$$\frac{\partial d}{\partial w2} = \frac{\partial d}{\partial C_2}\frac{\partial C_2}{\partial w1} = R_s\frac{\partial C_2}{\partial w2} = +0.600 \text{ ps/nm}$$

This confirms that maximizing the widths maximizes the delays, and the approximation:

$$d = d_{NOMINAL} + \frac{\partial d}{\partial w1}\Delta w1 + \frac{\partial d}{\partial w2}\Delta w2 \quad (5)$$

is used to compute the distribution of delays from the distributions of widths w1 and w2, and hence eliminate the pessimism of two corner analysis.

The far end delay has a more complex expression, but the principle is the same. Both $R_1$ and $C_1$ are a function of w1, so the chain rule on equation (4) is used to get $$\frac{\partial d}{\partial w1} = \frac{\partial d}{\partial C_1}\frac{\partial C_1}{\partial w1} + \frac{\partial d}{\partial R_1}\frac{\partial R_1}{\partial w1}$$
$$= (R_s + R_1/2)\frac{\partial C_1}{\partial w1} + (C_1/2 + C_2 + C_l)\frac{\partial R_1}{\partial w1}$$
$$= -0.716 \text{ ps/nm}$$

A similar calculation for delay as a function of w2 yields $$\frac{\partial d}{\partial w2} + 0.402 \text{ ps/nm}$$

From the signs of the derivatives, the longest delay will be with $\Delta w1$ negative and $\Delta w2$ positive, so the correct worst case corner is identified.

With this approach, the derivatives are used to get a first order approximation of the delay at any process conditions. The worst case corners may be determined from the signs of the derivatives. A distribution for process parameters can be inserted into this process to generate the resulting distribution of delays. No assumptions are needed on the shapes of the distributions, for example, there is no need to assume they are gaussian. Also, these delays can be added, subtracted, and compared without losing any correlations that may exist.

The memory requirements of keeping the variation with respect to process variables (such as a vector of derivatives) for every extracted component can be reduced using data compression. At first glance, it looks like 30 or so extra floating point values are needed for each component's derivative representation (other types of functional forms may in general use more data). However, each derivative can be normalized. For example, the derivative can be expressed as a percentage change of value from a percentage change of a process variable, so that a 1% change in width might result in a −0.8% change in R value. In this format, most if not all the derivative values are between −1 and 1. These values can be converted to fixed point, and stored in a byte to within 1% accuracy. This reduces memory used by a factor of 4 better.

Memory requirements can also be reduced by dropping the derivative terms with near 0 values. The properties of a wire on layer M2, for example, may depend strongly on only 4 process parameters, ILD M1-M2, M2 thickness, M2 width, and ILD M2-M3. If all the other variations are neglected, the properties could be represent as 6 bytes—a start index, a stop index, and 4 values. This results in a memory increase of six extra bytes per component—an eminently practical amount of data.

Therefore, although individual calculations may be complex, there are many fewer program runs (6 times fewer than with 6 corner analysis, for example). For example, the add, subtract, multiply, divide, and function calls may be replaced with an operation that keeps first derivatives. In this case, if there are N process variables, then each addition and subtraction has N operations. A multiply has 2N scalar multiplies and N additions. A divide has N multiplies, 2N divides, and a N subtractions. Each function call (such as sin( ), ln( ), or sqrt( )) has an underlying derivative calculation, N multiplies, and N additions. These numbers may be further improved by taking advantage of sparseness.

One feature of performing analysis using derivatives of process parameters is that the resulting calculations provide less conservative timing numbers compared with traditional methods, because there is no longer an assumption of $3\sigma$ variations on all parameters. This analysis using derivatives also can find design errors that are currently missed when using traditional approaches.

An example of the improvement provided by analysis with process derivatives is shown with a case where the delay depends only on 2 process parameters.

$$\text{Delay}=D_0+K_1P_1+K_2P_2$$

where $P_1$ and $P_2$ have 0 mean and standard deviations $\sigma_1$ and $\sigma_2$. Then the $3\sigma$ corner case will have delay:

$$D_0+3K_1\sigma_1+3K_2\sigma_2$$

Assuming $P_1$ and $P_2$ are independent, the distribution of delay is computed as a standard distribution with a mean of $D_0$ and a standard deviation of:

$$\sigma=((K_1\sigma_1)^2+(K_2\sigma_2)^2)^{1/2}$$

So the true $3\sigma$ value will be:

$$D_0+3((K_1\sigma_1)^2+(K_2\sigma_2)^2)^{1/2}$$

or equivalently:

$$D_0+((3K_1\sigma_1)^2+(3K_2\sigma_2)^2)^{1/2}$$

This is an improvement over traditional ways, since:

$$((3K_1\sigma_1)^2+(3K_2\sigma_2)^2)^{1/2}\leq 3K_1\sigma_1+3K_2\sigma_2$$

By the triangle inequality, the left side is the length of the hypotenuse of a right triangle with sides $3K_1\sigma_1$ and $3K_2\sigma_2$. The equality holds only in the case where all the $K_i$ are zero except one. In practice, however, each observation depends on more than one process parameter, and the inequality is strict. This example generalizes to more dimensions, and in general, the more parameters an observation depends on, the bigger the improvement. If an observation depends on N parameters, then improvement will range from 0 to $(1-1/(N)^{1/2})$.

For two parameters, the improvement can be over 28%, and for three parameters the improvement may be over 41%. The improvement increases as the number of parameters increases. Therefore, path delays will in general have a bigger percentage improvement than the individual stage delays, since they depend on more parameters (barring fortuitous parameter cancellation).

Also, with the technique of accounting for process variation in the design of integrated circuits, the yield due to timing effects can be computed. For example, starting with the paths in order of their nominal timing, longest paths first, find the odds the first path fails, then find the odds that the second path fails subject to the condition that the first is okay. Find the odds that the third fails subject to the condition that the first two are okay. Continue repeating until each new path is adding only a negligible probability of failure. However, the order does not matter except for efficiency, because a weighted integral over the volume outside the polytope of good chips is being measured. A different order just corresponds to doing the defining cuts in a different order, therefore the integral is unchanged.

Improving a critical path helps improve the parametric yield. The amount of improvement may be determined by removing the hyperplane associated with the path and determining how much the volume, or weighted volume, of the polytope increases. This technique allows a user to make a trade off between a slightly increased chip size and fewer, less critical paths.

Figure 4:
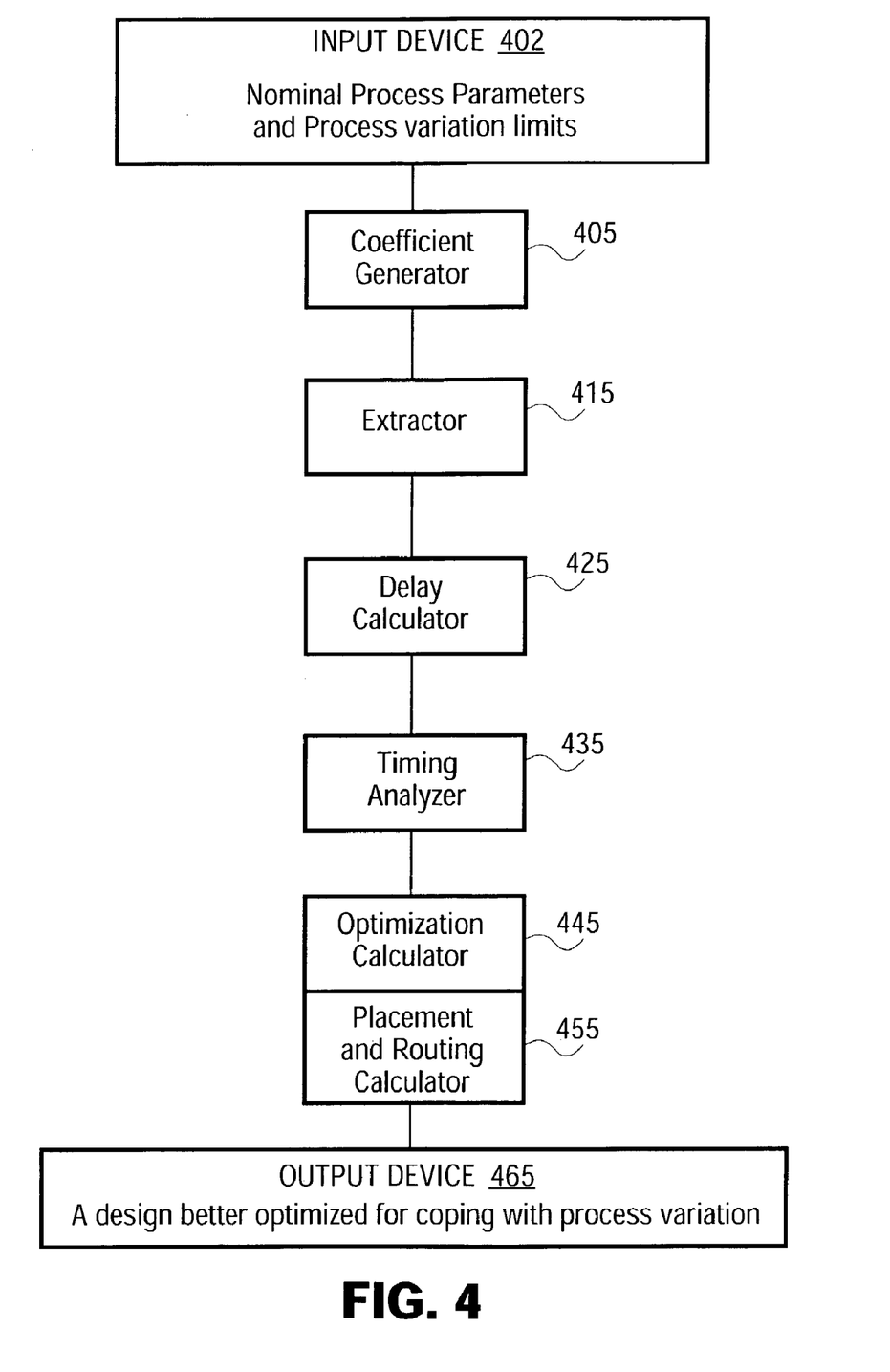
FIG. 4 shows an example of a device for accounting for process variations in the analysis of a design of an integrated circuit.

Accounting for the deviations in process parameters using nominal values and also the variations (such as derivatives) with respect to process deviation can be used throughout the calculation process. For example, accounting for process variation can be used to improve extraction, delay calculation, and timing analysis. FIG. 4 shows an example of a device for processing a circuit model that may be improved by accounting for process deviations. Nominal process parameters, and corresponding process variation limits, are input by device 402 to coefficient generator 405, which outputs coefficients as a function of process variation. The extractor 415 uses the coefficients to output component values, such as resistor, capacitor, and inductor values, as a function of process variation. The delay calculator 425 can then use the component values to determine delays and slews of the circuit as a function of process variations. The timing analyzer 435 receives these delays and slews and outputs path, setup, and hold delays as a function of process variation. A cell library, which can include the delay and timing calculations, can store these calculations as a function of process variation. Each variation with respect to each process parameter can be recorded in the library. The optimization calculator 445 and the placement and routing calculator 455 can generate a design for the circuit that is better optimized to cope with process variations. The output device 465 displays the design better optimized for coping with process variation to a user.

The coefficients calculated by generator 405 for use by extractor 415 are enhanced by accounting for process variation. Instead of computing values based on a single process condition, or a small number of conditions (e.g., fast and slow cases), each value in the file is replaced by a vector that includes the nominal value of a component, plus how it varies with respect to each process parameter. Thus, the variation of the coefficient file is a function of process variation.

The extractor 415 can generate an output that describes the value of the resistors, capacitors, and inductors, along with how these values vary with process parameters. Thus, the extractor generates both nominal values and their variation (such as derivatives) with process variation. Since the output of extractors is already one of the biggest data files in the IC design process, this may be combined with data compression to reduce memory requirements.

The delay calculator 425 can take values for components such as resistors, capacitors, and inductors, along with their process derivatives, and generate delays and slopes that depend on process parameters as output. The delay calculator can account for variation of cell delay with detailed process variation as well as the usual input slew, output load, and process summary variable 'P'. Thus, the delay calculation propagates changes with process variation.

Timing models for gates are also enhanced to carry information about process variation. Instead of describing the output delay and slope as a function of only the input slope and load (at one or at most a few process conditions), the description includes additional information about how these delays and slopes vary with each process parameter (or a selected number of the process parameters that are relevant to gate analysis). The timing calculator 335 can propagate changes in timing with process variation. Timing calculations that sum path delays and determine which ones are critical may be performed by keeping the variation with process parameters. The arrival times of the data and clock are expressed as a function of the process parameters. Timing pruning can be expressed as a function that depends on process variation.

Note that the pruning, in particular, may be done differently from that of a traditional timing verifier. For example, in a traditional verifier only the last arriving input is used. In a process sensitive verifier, the timing analyzer may determine under which, if any, conditions each input may be the last arriving. All inputs that could arrive last (in some feasible case) are kept. A similar analysis may be done when calculating required times.

Yield calculation can be estimated using the process sensitive approach. By looking at the variation of all timing paths with respect to process variations, the timing analyzer can compute the parametric yield. This may be performed by computing the fraction of the process space that results in all timing paths working. Optimization tradeoffs may also be performed using process sensitive analysis. Each path can have a computed likelihood of causing the chip to fall. This allows the optimizer 445 to determine if it's worth improving a path, even if the path is not critical under nominal operating conditions. Yield analysis can thus be determined from timing analysis and process variation. Also, optimization of chip design for working in the presence of process variation can be performed.

Data compression can be used to reduce the memory that is used by the calculation processes shown in FIG. 4. For example, each variation can be expressed as a percentage change in output versus a percentage change in input. For example, a C value may get 0.9% bigger for every 1.0% change in process parameter $p_1$. In this form each of the values has dynamic range defined by ±1. Fixed point encoding can then be used to store the values. These values may be stored using relatively few bits (perhaps 1 byte per variation). Also, many of these values may be near 0. These values can be omitted via run-length encoding, or inclusion of only a subset of values. Thus, the process sensitive approach allows a data compression scheme that can keep process variation data without excessive overhead.

Improvements from accounting for process variation include less pessimistic timing numbers, performing tradeoffs involving timing yield, and fewer missed errors. For example, designers spend a lot of time optimizing designs until they work at the worst case corners. This time is spent unnecessarily since these corners will seldom occur. The new scheme allows a much less conservative calculation of design values, and hence saves a lot of unneeded optimization. Also, this technique finds more errors. Traditional corner techniques will miss some errors, since they will not consider (for example) the case where metal-1 is fast but metal-2 is slow. This new technique will correctly find such error possibilities.

Also, this technique can result in fewer runs: best and worst corner analysis requires 2 extraction and two timing analysis runs. Traditional 4 and 6 corner analysis require between 2 and 6 runs. The technique of accounting for process variations can cover all cases of process variation in only one run.

The process variation technique can calculate yield due to timing, as opposed to a traditional timing verifier that merely gives a yes/no response at a given frequency. The process variation technique can be used to optimize non-critical paths for yield, whereas a conventional timing verifier/optimizer cannot determine the yield improvement for improving a non-critical path. This variation technique can optimize a design for timing yield.

Although examples of embodiments of accounting for process variation have been discussed, other embodiments may be used in accounting for process variation. For example,
during each step shown in FIG. 4, higher derivatives and cross terms (selectively) can be kept if higher accuracy is desired, or a different functional form (such as wavelets, for example) could be used to represent the deviation of the values as process variables change. Also, a bit mask, or other encoding technique, rather than run-length encoding to indicate the non-zero coefficients can be used. Similarly, the compression has been described terms of bytes as an exemplary explanation. Multiple parameters could be encoded per byte, or a series of parameters encoded as a bit stream. Also, input from a user can be used to adjust the amount of compression based on factors such as dynamic range, low accuracy needs, and likely contiguous non-zero elements, to construct an effective compression technique with the consequent savings of large amounts of memory.

The derivatives may be determined analytically rather than numerically. The various steps of the simulation may be integrated together in one tool, or performed in separate tools that communicate through files or other media, provided those files or media can express the variation of the values as a function of process variation. In other words, although FIG. 4 shows separate steps, these steps may be integrated in one tool, or combined in various ways. Nominal value and derivatives have been used as an example of one embodiment of a compact representation of how values vary with process deviation. Other functional forms of computing the effect of varying each process parameter can be used. In one embodiment, the variation of the values with the process parameters may be saved directly. Alternatively, the values could be used or stored with respect to another set of variables that are computed from the process parameters. This could have advantages, since the intermediate variables could be chosen to enhance such properties as linearity or independence of the parameters.

Figure 5:
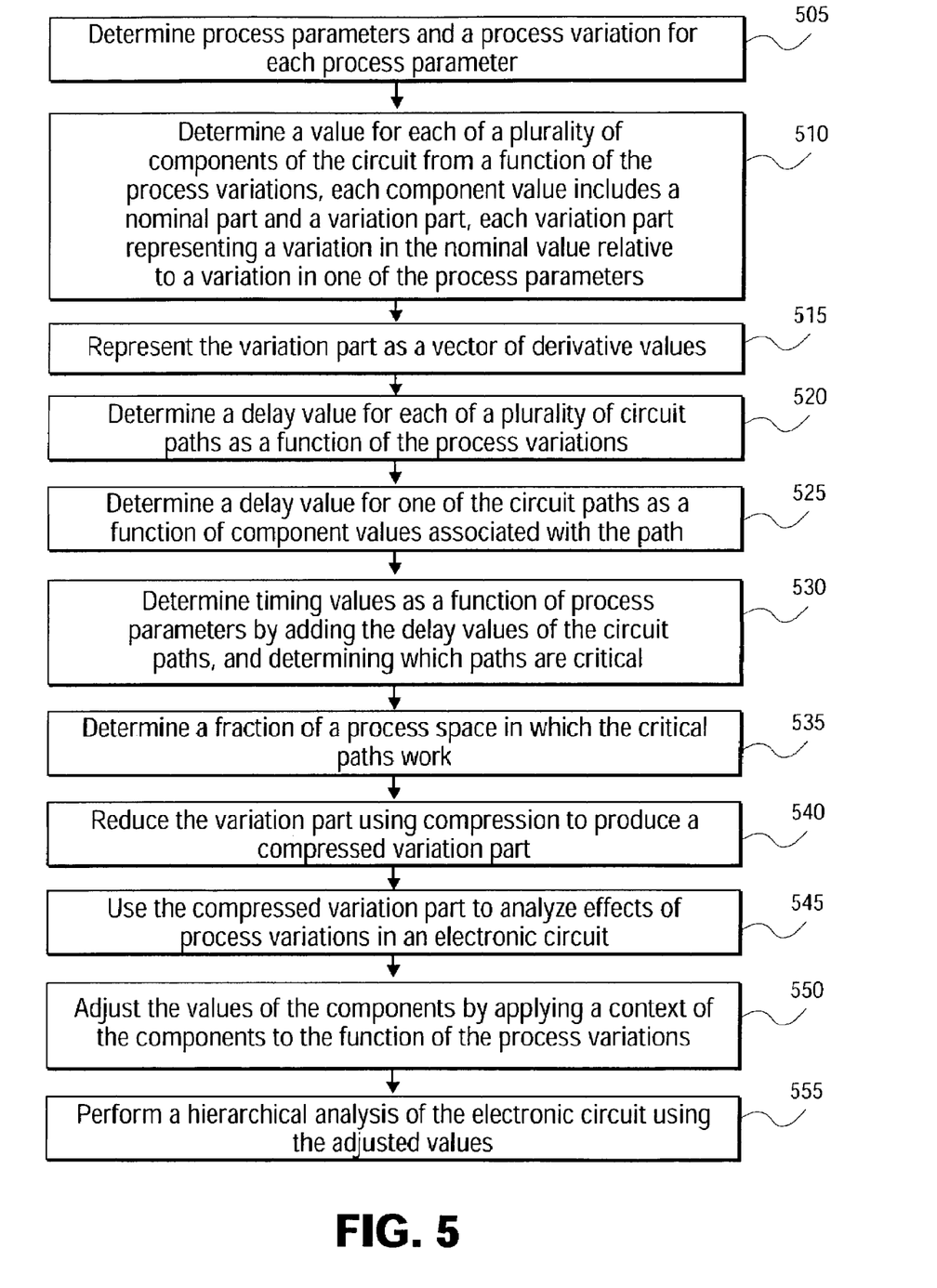
FIG. 5 shows an example of a method of accounting for process variations.

FIG. 5 shows an example of a method of accounting for process variations. Process parameters and a process variation for each process parameter are determined, 505. A value for each of a plurality of components of the circuit from a function of the process variations is determined, 510. Each component value includes a nominal part and a variation part, and each variation part represents a variation in the nominal value relative to a variation in one of the process parameters. The variation part is represented as a vector of derivative values 515. A delay value for each of a plurality of circuit paths as a function of the process variations may be determined, 520. A delay value for one of the circuit paths as a function of component values associated with the path may be determined, 525. Timing values as a function of process parameters may be determined by adding the delay values of the circuit paths, and by determining which paths are critical, 530. A yield of the circuit as a function of process parameters may be determined by determining a fraction of a process space in which the critical paths work, 535. The data for the variation part may be reduced by using compression to produce a compressed variation part, 540. The compressed variation part data may be used to analyze effects of process variations in an electronic circuit, 545. The values of the components of the electronic circuit design may be adjusted by applying a context of the components to the function of the process variations, 550. A hierarchical analysis of the electronic circuit design may be performed using the adjusted values, 555. This method may be implemented as a computer software program stored on a computer readable medium such as an electronic memory device for example. The program may be loaded into a computing device such as a general purpose computer with a computer processor for example. The computer may perform the method by executing the software program.

These and other embodiments of the present invention may be realized in accordance with the above teachings and it should be evident that various modifications and changes may be made to the above described embodiments without departing from the broader spirit and scope of the invention. The specification and drawings are, accordingly, to be regarded in an illustrative rather than restrictive sense and the invention measured only in terms of the claims.

The invention claimed is:

1. A machine implemented method of simulating a design of an electronic circuit comprising:
    simulating the design by analyzing the design of the electronic circuit by identifying one or more process parameters of the electronic circuit and at least one process variation for at least one of the one or more process parameters; determining a numeric value for a characteristic of at least one of a plurality of components of the electronic circuit, in which the characteristic comprises a nominal part and a variation part and the value is expressed as a polynomial function of the at least one process variation for the at least one of the one or more process parameters, wherein at least a part of the polynomial function is analytically determined, wherein the characteristic identifies a process condition of or a physical, an electrical, or a performance attribute of the at least one of a plurality of components;
    reducing the variation part of the component value by compression to produce a compressed variation part by pruning or removing a hyperplane, wherein the hyperplane identifies a condition for the electronic circuit with respect to the characteristic; and displaying a result of the reduction the variation part or storing the results in a tangible computer readable medium.

2. The method of claim 1, wherein the variation part represents a variation in the nominal value relative to a variation in one of the process parameters.

3. The method of claim 1, wherein the variation part is represented as a vector of derivative values.

4. The method of claim 1 further comprising:
    determining a delay value for each of a plurality of circuit paths as a function of the at least one process variations.

5. The method of claim 4 further comprising determining a delay value for one of the circuit paths as a function of component values associated with the path.

6. The method of claim 4 further comprising:
    determining timing values as a function of the one or more process parameters.

7. The method of claim 6, wherein determining timing values comprises adding the delay values of the circuit paths, and determining which paths are critical.

8. The method of claim 6 further comprising:
    determining a yield of the circuit as a function of the one or more process parameters.

9. The method of claim 6, wherein determining a yield comprises
    determining a fraction of a process space in which the critical paths work.

10. The method of claim 1, where the compressed variation part is used to analyze effects of process variations in an electronic circuit.

11. The method of claim 2, further comprising:
    adjusting the values of the components by applying a context of the components to the function of the at least one process variation; and
    performing a hierarchical analysis of the electronic circuit using the adjusted values.

12. An article of manufacture comprising a computer readable medium storing instructions which, when executed by a processing system, cause the system to perform a method of simulating a design of an electronic circuit, the method comprising:
    simulating the design by analyzing the design of the electronic circuit by identifying one or more process parameters of the electronic circuit and at least one process variation for at least one of the one or more process parameters; determining a numeric value for a characteristic of at least one of a plurality of components of the electronic circuit, in which the characteristic comprises a nominal part and a variation part and the value is expressed as a polynomial function of the at least one process variation for the at least one of the one or more process parameters, wherein at least a part of the polynomial function is analytically determined, wherein the characteristic identifies a process condition of or a physical, an electrical, or a performance attribute of the at least one of a plurality of components;
    reducing the variation part of the component value by compression to produce a compressed variation part by pruning or removing a hyperplane, wherein the hyperplane identifies a condition for the electronic circuit with respect to the characteristic; and displaying a result of the reduction the variation part or storing the results in a tangible computer readable medium.

13. The medium of claim 12, wherein the instructions, when executed, cause the system to perform the method further comprising:
    determining a delay value for each of a plurality of circuit paths as a function of the process variations.

14. The medium of claim 13, wherein the instructions, when executed, cause the system to perform the method further comprising:
    determining a delay value for one of the circuit paths as a function of component values associated with the path.

15. The medium of claim 13, wherein the instructions, when executed, cause the system to perform the method further comprising:
    determining timing values as a function of one or more process parameters.

16. The medium of claim 15, wherein the instructions, when executed, cause the method to perform determining timing values by:
    adding the delay values of the circuit paths, and
    determining which paths are critical.

17. The medium of claim 14, wherein the instructions, when executed, cause the system to perform the method further comprising:
    determining a yield of the circuit as a function of the one or more process parameters.

18. The medium of claim 14, wherein the instructions, when executed, cause the system to perform determining a yield by:
    determining a fraction of a process space in which the critical paths work.

19. The medium of claim 12, wherein the compressed variation part is used to analyze effects of process variations in an electronic circuit.

20. The medium of claim 12, wherein the instructions, when executed, cause the system to perform the method further comprising:
- adjusting the values of the components by applying a context of the components to the function of the process variations; and
- performing a hierarchical analysis of the electronic circuit using the adjusted values.

21. An apparatus to simulate an electronic circuit comprising:
- means for simulating the design by analyzing the design of the electronic circuit by identifying one or more process parameters of the electronic circuit and at least one process variation for at least one of the one or more process parameters; determining a numeric value for a characteristic of at least one of a plurality of components of the electronic circuit, in which the characteristic comprises a nominal part and a variation part and the value is expressed as a polynomial function of the at least one process variation for the at least one of the one or more process parameters, wherein at least a part of the polynomial function is analytically determined, wherein the characteristic identifies a process condition of or a physical, an electrical, or a performance attribute of the at least one of a plurality of components;
- means for reducing the variation part of the component value by compression to produce a compressed variation part by pruning or removing a hyperplane, wherein the hyperplane identifies a condition for the electronic circuit with respect to the characteristic; and
- means for displaying a result of the reduction the variation part or storing the results in a tangible computer readable medium.

22. The apparatus of claim 21 further comprising:
- means for determining a delay value for each of a plurality of circuit paths as a function of the at least one process variations.

23. The apparatus of claim 22 further comprising:
- means for determining a delay value for one of the circuit paths as a function of component values associated with the path.

24. The apparatus of claim 22 further comprising:
- means for determining timing values as a function of the one or more process parameters.

25. The apparatus of claim 24, wherein said means for determining timing values comprises:
- means for adding the delay values of the circuit paths, and means for determining which paths are critical.

26. The apparatus of claim 24 further comprising:
- means for determining a yield of the circuit as a function of the one or more process parameters.

27. The apparatus of claim 24, wherein said means for determining a yield comprises:
- means for determining a fraction of a process space in which the critical paths work.

28. The apparatus of claim 21, further comprising:
- means for using the compressed variation part to analyze effects of process variations in the electronic circuit.

29. The apparatus of claim 21, further comprising:
- means for adjusting the values of the components by applying a context of the components to the function of the process variations; and
- means for performing a hierarchical analysis of the electronic circuit using the adjusted values.

30. The method of claim 1 further comprises determining a first value for the variation part of the characteristic by extraction.

31. The method of claim 1 further comprises a first characteristic of a first component and a second characteristic of a second component of the electronic circuit in which the first characteristic is related to the second characteristic.

* * * * *